May 15, 1951  E. POPOFF  2,553,003
AUTOMATIC CLASSIFIER
Filed July 30, 1946  10 Sheets-Sheet 2

INVENTOR
EMMANUEL POPOFF

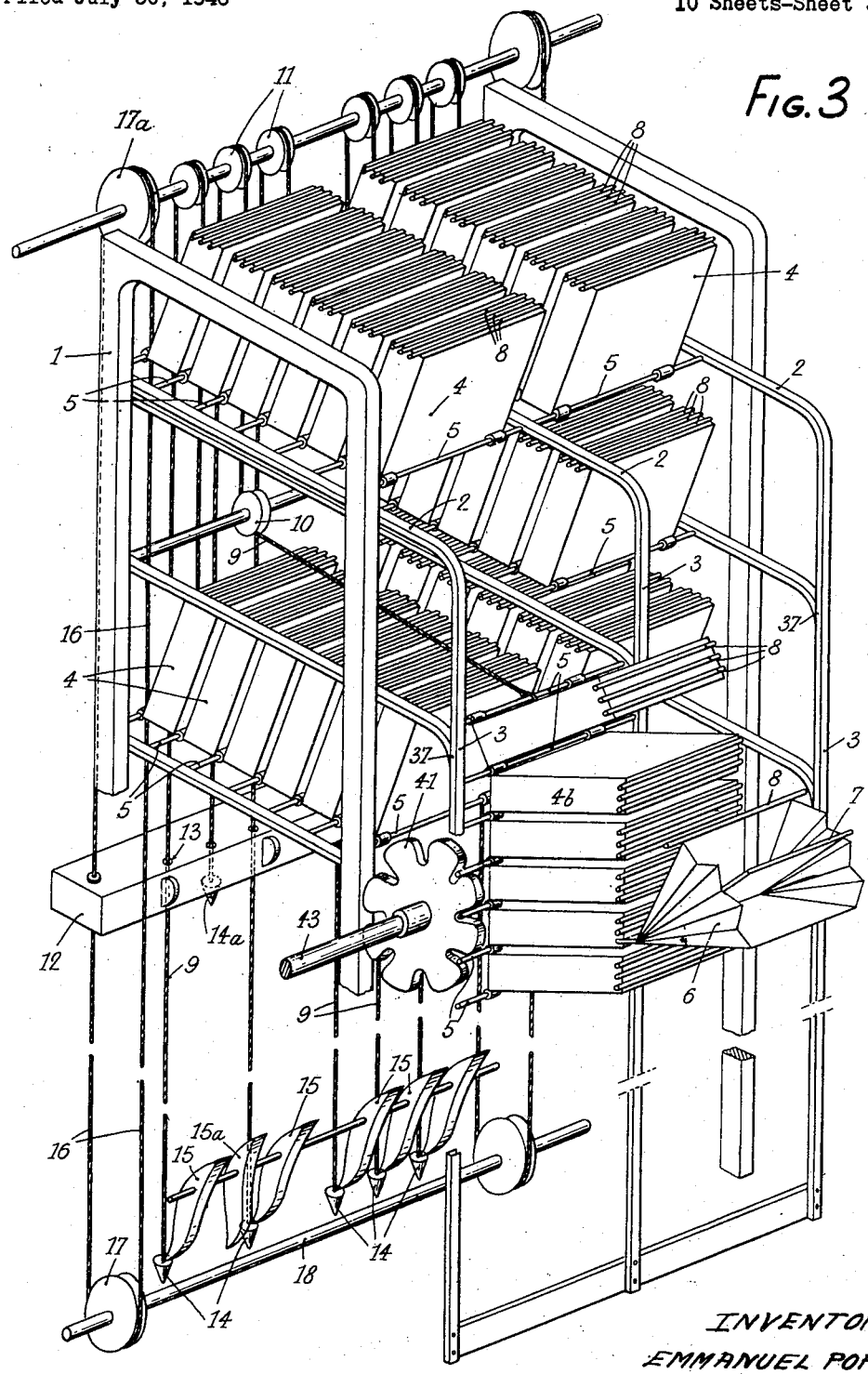

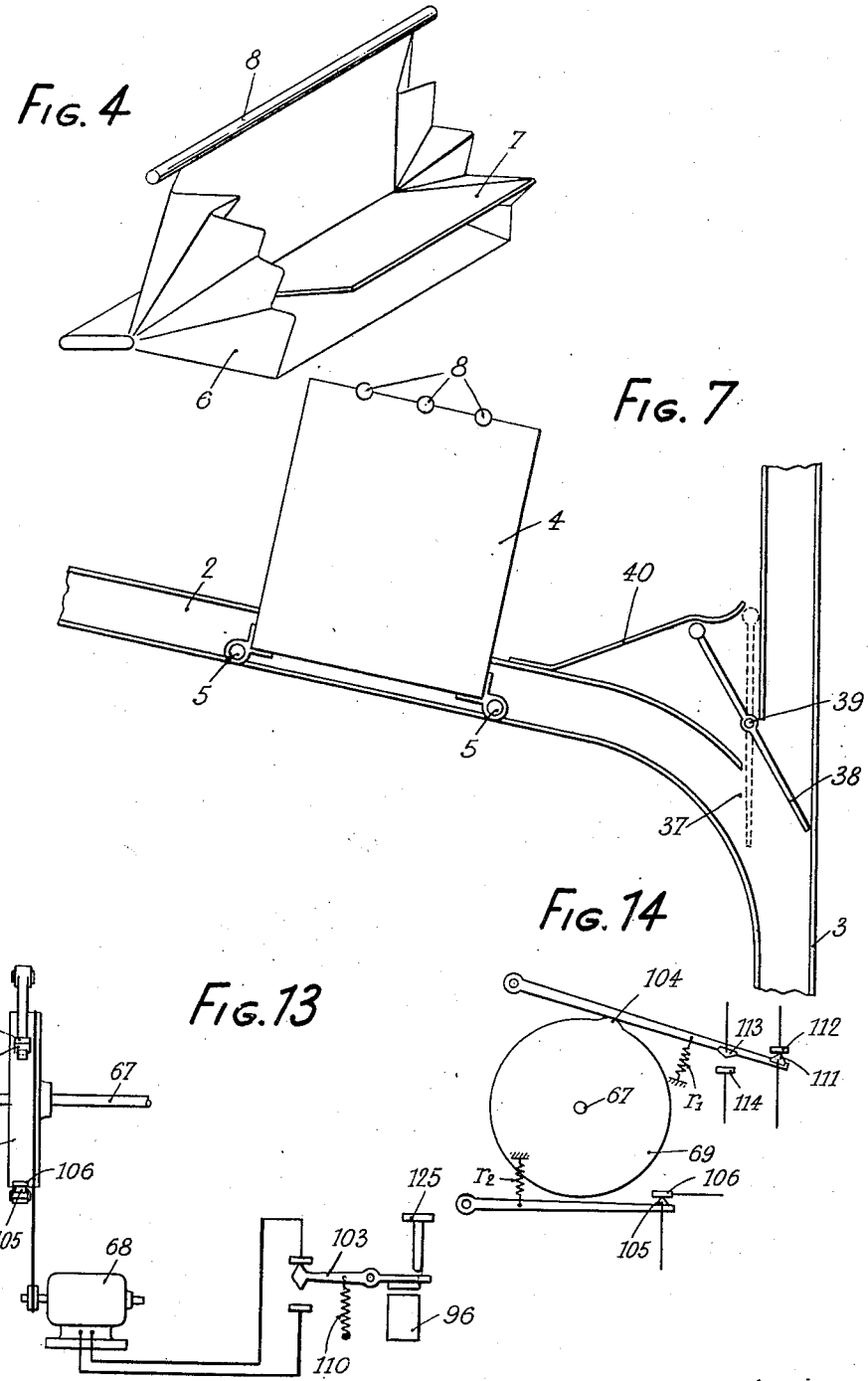

May 15, 1951   E. POPOFF   2,553,003
AUTOMATIC CLASSIFIER
Filed July 30, 1946   10 Sheets-Sheet 5

INVENTOR
EMMANUEL POPOFF

May 15, 1951   E. POPOFF   2,553,003
AUTOMATIC CLASSIFIER
Filed July 30, 1946   10 Sheets-Sheet 6

INVENTOR
EMMANUEL POPOFF

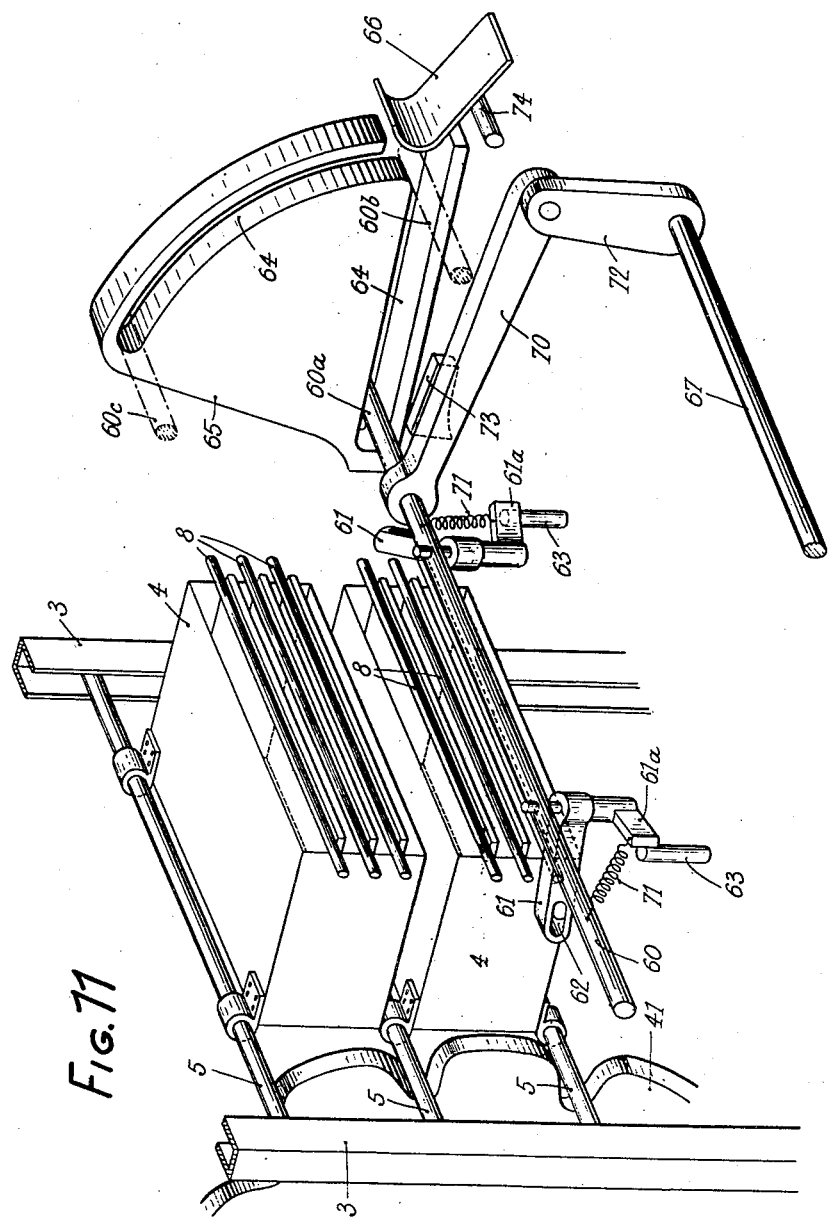

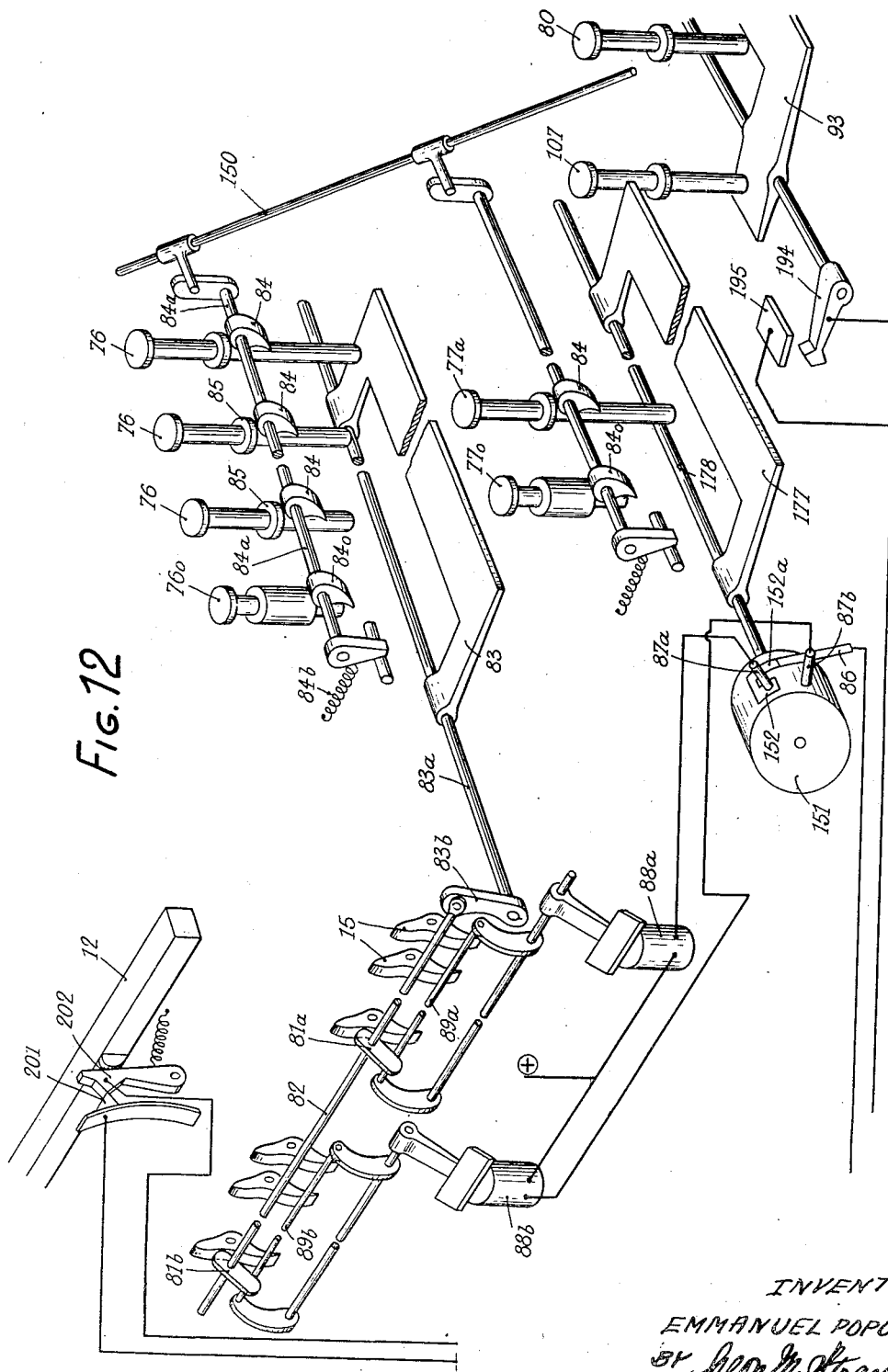

May 15, 1951     E. POPOFF     2,553,003
AUTOMATIC CLASSIFIER
Filed July 30, 1946     10 Sheets-Sheet 9
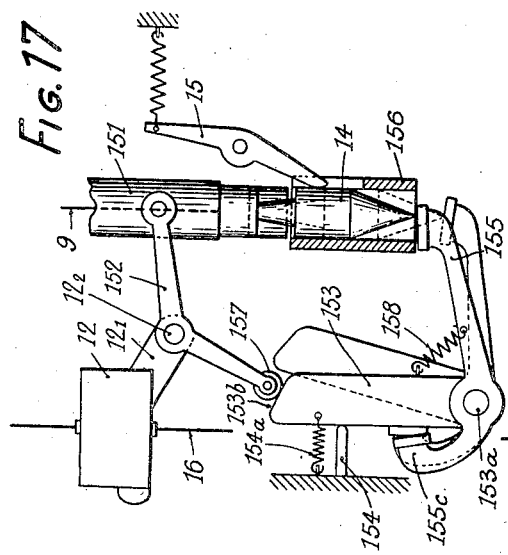
INVENTOR
EMMANUEL POPOFF

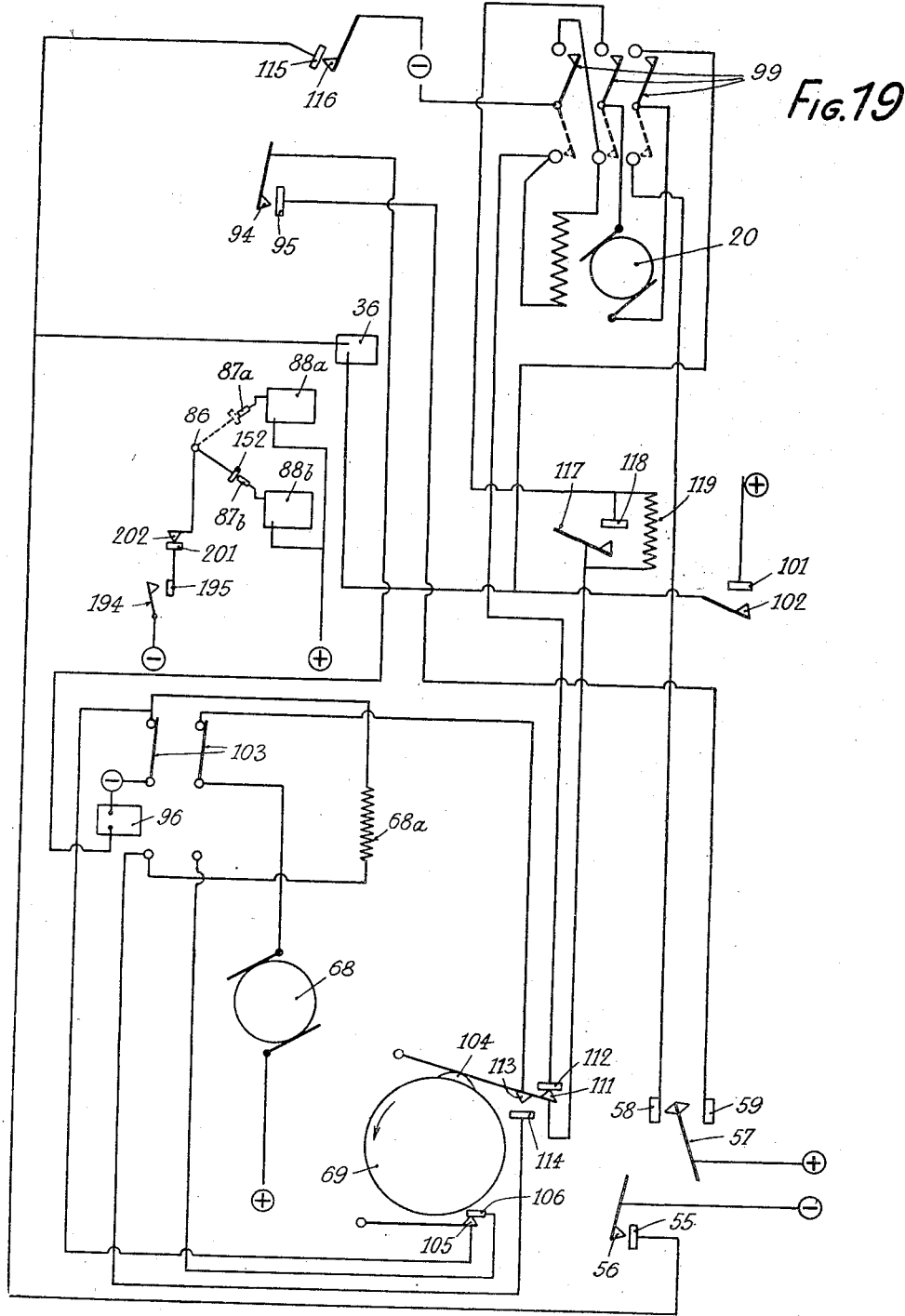

Patented May 15, 1951

2,553,003

UNITED STATES PATENT OFFICE 2,553,003

AUTOMATIC CLASSIFIER

Emmanuel Popoff, Paris, France

Application July 30, 1946, Serial No. 687,110
In France March 25, 1944

7 Claims. (Cl. 129—16.1)

My invention has for its object an automatic classifier which allows bringing at a very high speed and in an automatic manner a document or group of documents to which a number has been ascribed within reach of the person requiring same. This improved classifier has as one of its prominent features the provision of means permitting grouping a certain number of documents so that desired documents are brought automatically to the person requiring them. A further interesting object of my invention resides in the fact that the documents are placed inside an accordion-shaped receptacle which opens automatically as soon as it arrives in front of the user. Thus, it is possible to insert inside each fold of the accordion not only a reference card as in the usual case, but as well a set of documents, provided the thickness of this set of documents is not too considerable and that its size corresponds with the depth of the accordion. Of course, when speaking of reference cards, this term covers as well any other document such as a group of documents, as just mentioned, any flat object, tickets, coupons, booklets and the like, provided only they receive a suitable predetermined classification number.

The proposed classifier is different from most other classifiers due to the fact that it prevents in an absolute manner any error and that once a reference card or the like is inserted within a predetermined fold of a numbered accordion, it arrives automatically within reach of the user, provided the latter has correctly formed the number of this reference card. On the other hand, the improved classifier removes also the possibility of any error at the moment of classification by reason of the fact that a single accordion may be brought at a time within reach of the user, so that it is sufficient for the latter to classify at this moment inside the open accordion the number of reference cards or the like corresponding to the number of folds of the accordion. This number of folds may be chosen as desired. In the preferred case this number is selected so that the classification may de decimal.

A further advantage of the classification according to my invention resides in the fact that once the accordion lying in front of the user's eyes has been turned to account, it is sufficient to depress a key for closing the accordion which returns into its recess whereupon the movable system of which it forms a part is returned automatically into its inoperative position.

My classifier is constituted chiefly by a plurality of boxes, a suitable number of which forms a train: for instance 10 boxes may form a train in the case of a decimal classification; thus, for instance, to give an idea of the possibilities of the invention, each train comprises 10 boxes, each box 10 accordions and each accordion 10 reference cards or documents so that each train may contain 1000 cards. The trains considered are arranged in tiers or columns by reason say of 10 trains per column, i. e. 10,000 cards per column. Supposing the breadth of the walls allotted to the classification allows it, it is possible by juxtaposing such columns to provide in the space allowed 10, 20, 30 or more columns so as to classify 100,000, 200,000, 300,000 cards and more.

The following description refers to the accompanying drawings which by way of example will allow the manner of executing the invention.

In said drawings:

Fig. 3 is a diagrammatic perspective view showing part of the classifying mechanism.

Fig. 4 is a separate view of the accordion-shaped member adapted to receive the reference or index cards.

Fig. 7 is a diagrammatic view at a larger scale illustrating the switching means provided for the boxes with reference to the vertical guiding rails thereof.

Fig. 11 is a diagrammatic perspective view at a larger scale showing the means of removing an accordion from its box.

Fig. 12 is a diagrammatic perspective showing the keys and cooperating members controlling the operation of the classifier.

Figs. 13 and 14 are respectively a front view and a side view of the device controlling the operation of the motor for extracting the accordion members from their boxes.

Figs. 15, 16, 17 and 18 show four different positions of the train engaging catch system.

Figure 1:
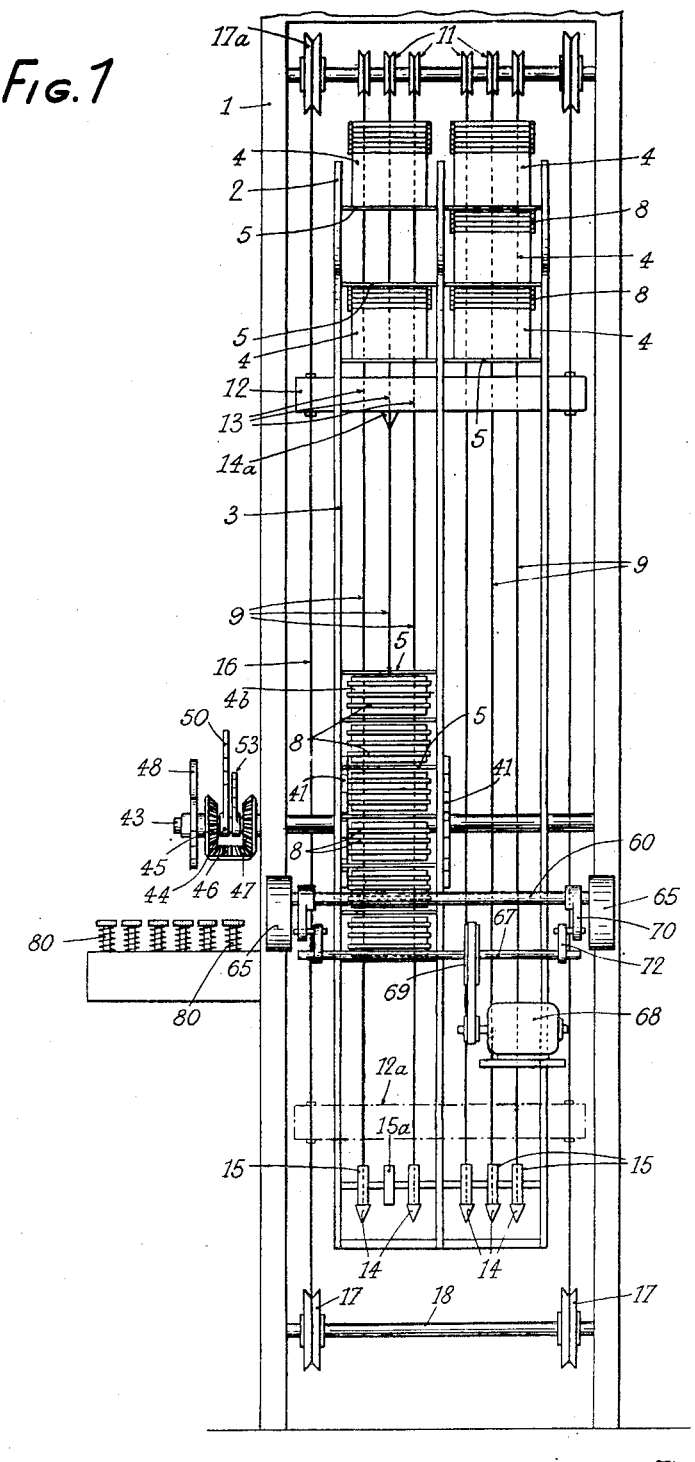
Fig. 1 is a front view of an automatic classifier made according to my invention.

Lastly Fig. 19 is a wiring diagram of the electrical connections.

The apparatus includes chiefly a frame 1 (Fig. 3) provided with a certain number of columns, say two, as in the case illustrated. Each column comprises a certain number of superposed box stories 4. In the example illustrated there are three stories of such boxes 4 per column. In each story a train of boxes rests on a U-shaped rail 2, said rails sloping forwardly through an angle of say 30° in the example illustrated. The rails extending beyond the different stories of a column are all connected with the vertical common rail 3 of the column considered.

The boxes 4 of each story are interconnected through hinges 5 so as to form a train. In the example illustrated each train is constituted by 6 boxes.

In each box, there is provided a plurality of accordion members 6 in the folds of which are inserted the reference cards or index cards 7 to be classified (see Fig. 4).

In the form of execution illustrated each accordion includes three folds and may consequently receive three cards.

In brief, in the above described form of execution it is possible to classify $2 \times 3 \times 6 \times 3 \times 3 = 324$ reference cards. Of course, this comparatively low number has been chosen only for sake of an easier disclosure and as specified hereinabove the automatic classifier according to my invention allows storing a very large number of cards as the latter are located in generally unoccupied portions of the premises. As a matter of fact and in accordance with the invention, the cards are brought mechanically within reach of the person using the arrangement, but in their inoperative classification or storing position they may be housed in normally inaccessible points. This allows in particular making use of the upper part of the wall of a room reaching up to the ceiling.

Each accordion member is provided with a rod 8 secured to its upper edge and allowing it to be extracted from the box containing said accordion member. All the boxes from any train i. e. the boxes located in the same story of a column are interconnected through hinges pivotally carried by the rods shown at 5 and each train is carried by a cable 9 passing over pulleys 10 and 11, said cable passing through a counterweight 12 common to all the trains and ending with a cone shaped member 14 the diameter of which is higher than the opening 13 provided in the counterweight 12 for the passage of the cable 9.

In the storing condition of the train, the counterweight 12 is in its lower inoperative position, i. e., at the lower end of its stroke; each cone 14 is than held fast by a corresponding catch 15 which prevents any downward motion of the train considered.

The counterweight 12 is secured through its ends to cables or chains 16 which are wound over the lower and upper pulleys 17 and 17a. The whole is driven through the agency of the pulleys 17 which are keyed to the horizontal shaft 18. The movement is transmitted to the shaft 18 through the agency of a pulley 19 (Fig. 6) secured to said shaft and driven by a motor 20 with the interposition of a change speed device which will be now described with reference to Figs. 5 and 6.

The device includes a shaft 24 to which are keyed three pulleys 21, 22 and 23, the pulley 22 being driven directly by the motor. A second shaft 25 extends in parallelism with the shaft 24 and to said shaft 25 are keyed a pulley 26, one element of a clutch 27 and a ratchet-wheel 28. On this shaft 25 is also mounted a pulley 29 connected through a belt with the pulley 23 on the shaft 24 and carrying a catch 30 adapted to engage the ratchet-wheel 28. The pulley 29 includes an axial projection provided with a groove 31 engaged by the end of a lever 32 in a manner such that the pivotal motion of said lever 32 round its axis may produce a sliding motion of the pulley 29 over its shaft 25; the sliding of the pulley 29 over the shaft 25 allows bringing the catch 30 into engagement with the ratchet-wheel 28 or to release same. When the pulley 29 is in its position to the extreme right of its travel, which position corresponds to the engagement of the catch 30 with the wheel 28, a catch 33 urged upwardly by spring not illustrated in the drawing holds it in said position of engagement.

If the lever 32 is caused to pivot in an anti-clockwise direction by drawing the rod 98 in the direction of the arrow (Fig. 6) the catch 33 is momentarily released by the left hand arm of the lever 32 and the pulley 29 is displaced towards the right by the right hand arm of said lever 32, which brings the catch 30 into engagement with the ratchet-wheel 29.

The clutch 27 includes a second element loosely mounted on the shaft 25 and driven by the pulley 21 through the agency of a belt while the above mentioned clutch element secured to the shaft 25 includes two levers 34 the inner ends of which are adapted to engage the inner wall of the first clutch element 27 and the other ends of which are engaged by a lever 35 which when in its operative position urges said levers 34 against the first or loose clutch element 27. The lever 35 is actuated by an electro-magnet 36. The pulley 21 and clutch elements 27 are substantially of equal diameter whereby when the clutch is operated the shafts 24 and 26 rotate at substantially equal speeds. On the contrary, the pulleys 23 and 29 have very different diameters, the diameter of 29 being for instance ten times larger than that of 23. Consequently when the clutch is operated, the pulley 29, rotating ten times slower than the shaft 24 rotates also ten times slower than the shaft 25. If the rotary motion of said shaft 25 is executed clockwise the ratchet-wheel 28 keyed to the shaft 25 will slide with reference to the catch 30. As soon as the clutch 27 is disengaged, the shaft 25 is no longer driven directly through the pulley 21 and begins slowing down. At a certain moment its speed becomes equal to that of the pulley 29 and has a tendency subsequently to sinking below said value. At this moment one catch 30 engages one of the teeth of the ratchet-wheel 28 and drives the latter at the reduced speed which is that of the pulley 29. Consequently the disconnection of the clutch 27 causes the speed of rotation of the shaft 25 to pass from a high value to a low value but constrains the rotation of the shaft to continue.

At the connection between the vertical rails 3 and each sloping rail 2, except for the uppermost rail 2 is provided a switching system 37 (Fig. 7), said switching system including a blade 38 adapted to pivot round an axis 39 and submitted to the action of the spring 40 so as to be yieldingly bolted in either of the positions illustrated in Fig. 7 respectively in full drawn and in broken lines.

When a train of boxes moves downwards over its rails 2 the rod 5 forming the hinge on the first box of the train pushes the blade 38 of the corresponding switch into the position shown in full drawn lines in Fig. 7. Then, as the train moves further down along the vertical rails 3, the aforesaid hinge rod 5 brings the blade 38 of the successive switching systems met by the train into the position shown in dotted lines in Fig. 7.

The blade 38 is held in position by the spring 40. When the train of boxes is caused to move in the opposite direction and returns on to its rail 2, it passes over the switching system without being shunted, the switching blade being in the position illustrated in dotted lines, until it meets the blade 38 previously rocked by the advance of the train into its position drawn in full lines and the train is then constrained to return on to the rails 2 from which it has originally started.

Figure 8:
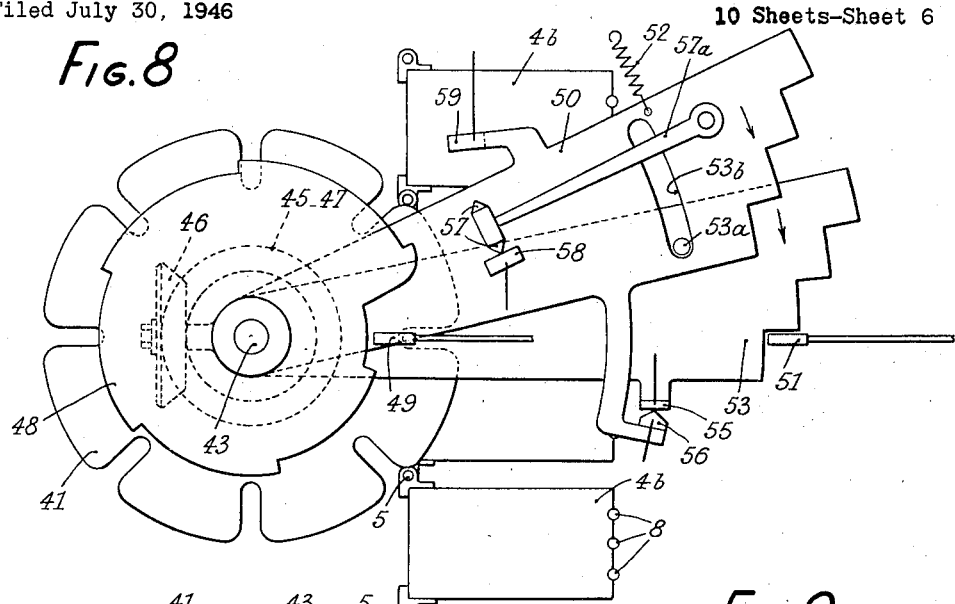
Fig. 8 is a side view at a larger scale of the mechanism controlling the stopping of the trains in a predetermined position.
Figure 9:
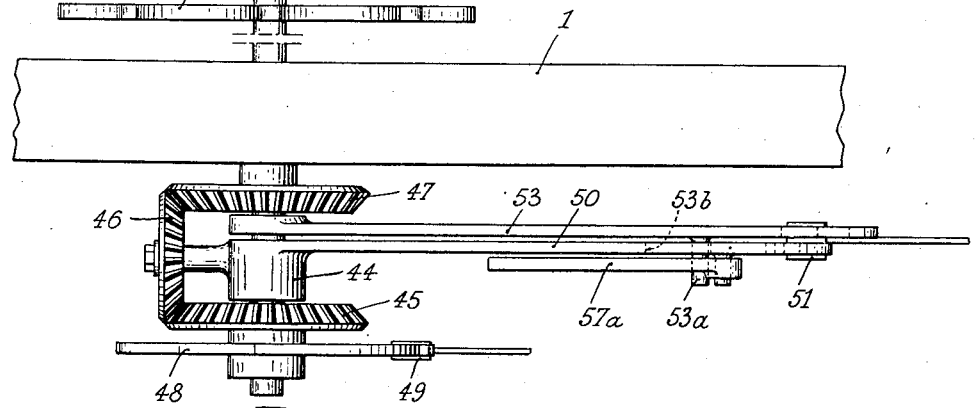
Fig. 9 is a plan view corresponding to Fig. 8.

Each train of boxes moving downwardly along the vertical rails 3 engages at a given moment a toothed wheel 41 (Figs. 2, 3 and 8), the hinge axis 5 between two successive boxes engaging the recessed intervals of said wheel 41. The original position of the wheel 41 is defined by any suitable device. The wheel 41 is keyed to a shaft 43 which carries also a bevel gear system 45, 46, 47 forming a differential (Fig. 9). The sunwheel 47 is keyed to the shaft 43 while the sunwheel 45 is mounted loosely on said shaft. Lastly the planet pinion 46 is pivotally mounted on an axis carried by a sleeve 44 also mounted loose on the shaft 43. The sunwheel 45 is rigid with a spurwheel 48 provided with teeth arranged spiralwise at the periphery of this wheel; the number of these teeth is equal to the number of boxes in each train, six in the case considered. Moreover the size of each tooth corresponds to the thickness of the box and to the distance between two hinge rods 5 succeeding one another in a train of boxes. The rotation of the wheel 48 round the shaft 43 may be stopped by means of a stop 49 radially movable with reference to said wheel and adapted to assume any of six different longitudinal positions corresponding each to the radius of one of the teeth of the wheel 48. In other words, for each of the six different positions which may be given to the stop 49 the wheel 48 is arrested by this stop in a different angular position. The sleeve 44 carries a blade 50 rigidly secured thereto and provided with three teeth as shown in Figs. 8 and 9, the number of these teeth being equal to the number of accordion members provided in each box. The total angular length of these three teeth corresponds to the length of each of the six teeth of the wheel 48, i. e. each tooth of the blade corresponds to one third of a tooth of the wheel 48. The three teeth of the blade 50 are radially shifted with reference to one another in a manner such that they may be stopped by a sliding stop 51 in accordance with the position of said stop on a straight line passing radially through the axis of the sleeve 44.

The blade 50 is urged towards its original position by a spring 52 (Fig. 8). On the shaft 43 is also mounted another blade 53 parallel with the blade 50 and of the same shape as the latter. Said blade 53 is mounted loose on said shaft 43. The blade 53 is provided with a stud 53a engaging an arcuate groove 53b cut in the blade 50. In the original or inoperative position of the blade 50, the blade 53 under the action of its weight occupies a position which is defined by the engagement of the stud 53a against the lower end of the groove 53b. The blades 50 and 53 include various electric contacts adapted to be inserted in the wiring diagram of Fig. 19. These contacts are as follows:

(a) 55—56, one of the elements of which is carried by the blade 53 while the other 56 is carried at the end of a projection rigid with the blade 50. In their inoperative or original position, said elements are in contact as shown in Fig. 8.

(b) 57—58 both carried by the blade 50, the contact-piece 58 being directly secured to this blade while the other contact-piece 57 is carried at the end of an arm 57a pivotally secured to the blade 50 and adapted to be displaced by the stud 53a. In the inoperative position of the different members, the contact-pieces 57 and 58 are in contact as also shown in Fig. 8.

(c) 57—59, the contact-piece 57 being mounted on the blade 50 as just disclosed while the contact-piece 59 is carried by a lug rigid with the blade 50. In the original or inoperative position illustrated in Fig. 8, the contact-pieces 57 and 59 are not in contact with one another.

I will now describe at once the operation of the arrangement for stopping the train of boxes in the position required for the removal of a given card from the classifying system:

As soon as a train of boxes moving down the rails 3 begins meshing with the wheel 41, the latter through the agency of the shaft 43 drives the sunwheel 47 of the differential. As the spring 52 urges the blade 50 into its original position, the sleeve 44 carrying this blade is also yieldingly held in the corresponding position and the axis of the planet pinion 46 remains stationary. The rotation of the sunwheel 47 is thus transmitted integrally to the sunwheel 45 through the agency of the planet pinion 46.

However the rotation of the sunwheel 45 stops as soon as the wheel 48 rigid with the sunwheel 45 engages, through one of its stepped teeth, the stop 49. This stops the rotation of the sunwheel 45 and constrains the axis of the pinion 46 to rotate radially with reference to the shaft 43, the blade 50 being thus carried along in a plane perpendicular to said axis of the shaft 43. Thus the blade 53 which is engaged by the stud 53a of said blade 50 moves also in a clockwise direction at the same speed as the blade 50. The blade 53 being shifted downwardly with reference to the blade 50, said blade 53 will be the first to engage the stop 51 through one of its teeth. The stopping of the rotation of the blade 53 causes the immediate separation of the contact-pieces 55—56. The blade 50 continues its rotation until it is stopped in its turn by the stop 51 abutting against the corresponding tooth of said blade 50. At this moment, the contact 57—58 opens and the contact 57—59 closes. As explained hereinafter, the opening of the contact at 55—56 has for its result a reduction in the speed at which the train of boxes moves downwardly and thereby a reduction in the speed of the wheel 41 so that the last part of the movement is executed more slowly. The opening of the contact at 57 breaks the circuit of the driving motor and stops consequently completely the movement of the train. Lastly the closing of the contact 57—59 starts the motor which is to make the desired accordion pass out of a predetermined box.

Figure 2:
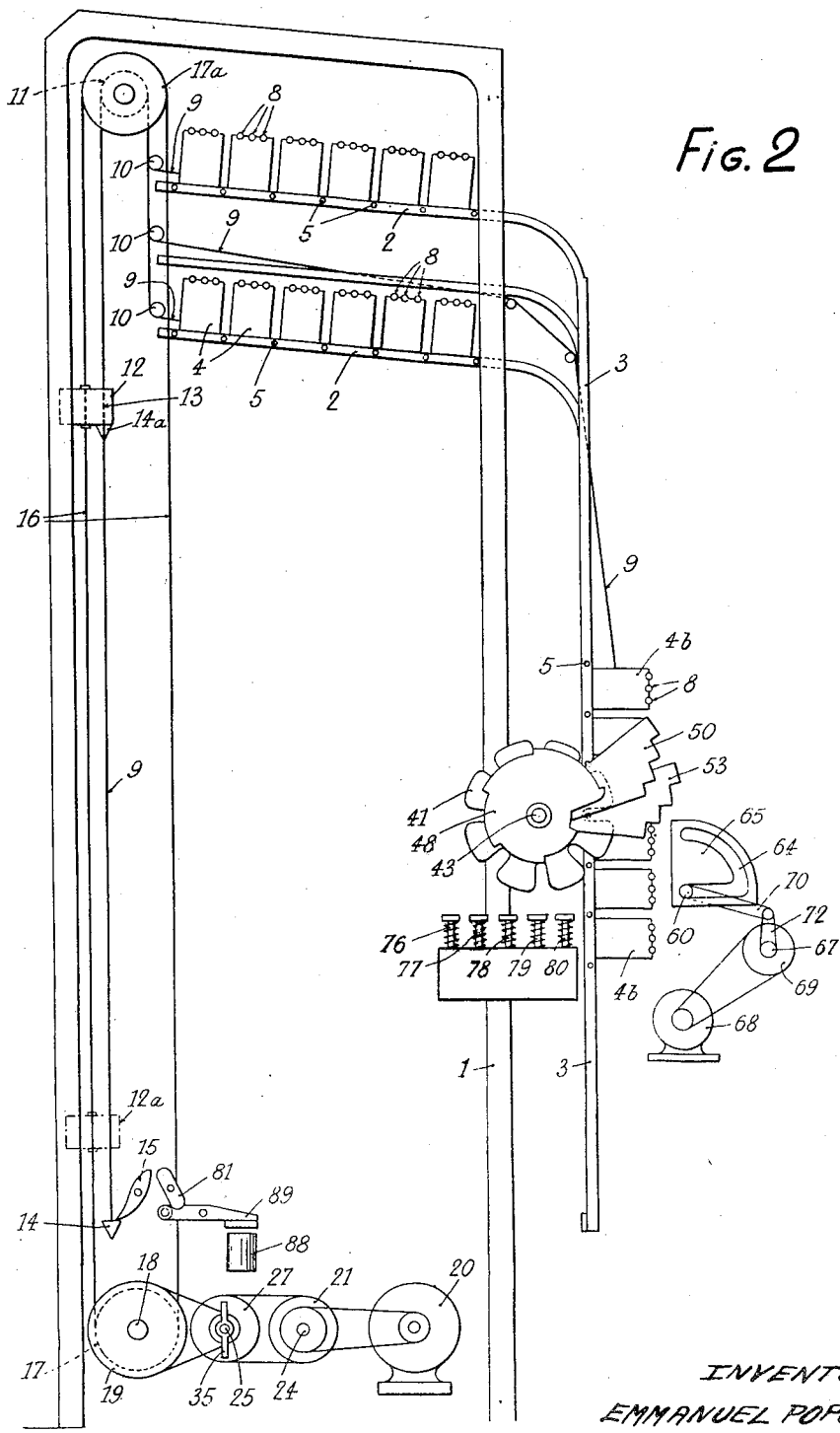
Fig. 2 is a side elevational view of the same classifier.

I will now describe the mechanism which leads to the extraction of this accordion (see Figs. 1, 2 and 11). The operation of the accordion is obtained through a bar 60 located in front of the rails 3 and the ends of which engage slots 64 in members 65 carried by the frame. The bar 60 is provided for each column of boxes with two carrier arms 61 each provided with an opening 62. These arms 61 are pivotally secured to the bar 60 so as to be capable of rotating round vertical axes. Stops 63 carried by the frame are arranged so as to cooperate with studs 61a, rigid with the arms 61 and urged towards the stops by the spring 71. As long as the studs 61a are held by the stop 63 against the action of the spring 71 the arms 61 remain spaced away from the rods 8 of the accordion members and allow the latter to pass freely in front of the bar 60.

The bar 60 is connected through a link 70 with a crank 72 keyed to a shaft 67 which is in its turn driven by a pulley 69 connected with a motor 68. The rotation of the crank 72 has for its result a sliding movement of the end of the bar 60 along the slots 64. During this movement the bar 60 moves first towards the front up to the end of the horizontal portion of the groove 64 at 60b. At this moment a lateral extension 73 on the connecting rod 70 engages a stop 74 whereby the end of the bar 60 is urged upwardly into the terminal upwardly directed arcuate portion of the groove 64. The crank 72 is then at its lower dead point. The crank 72 continuing its motion causes thus the end of the bar 60 to advance through said arcuate portion of the groove 64 until said end enters the position shown in dot-and-dash lines at 60c. During the reverse movement of the crank 72, the end of the bar 60 sinks first along the arcuate part of the groove 64 and to this end it should overcome the very slight resistance of the spring blade 66 which urges it into the horizontal portion of the groove 64 after which it returns ultimately into its original position 60a.

I will now examine again the above disclosed movement with a view to examining its consequences on the accordion member located in front of the bar 60 and it will be apparent that the following operations succeed one another during said movement.

As soon as the bar 60 begins moving away from the accordion, the spring 71 causes the arms 61 to pivot towards one another, said arms being no longer under the action of the stop 63 so that after a certain travel executed by the bar 60, the holes 62 in the arms 61 engage the ends of the rod 8 of the accordion considered. The accordion is now drawn out by the bar 60 and the other accordions of the corresponding box are held back by means of small bars not illustrated carried by the frame. During the horizontal movement of this bar 60, the accordion is thus drawn out of its box 4. Then, through the displacement of the bar 60 along the arcuate portion of the groove 64, the accordion member is opened. It is thus brought into the position illustrated in Fig. 4 and it is easy to extract from said accordion the desired reference card 7.

When the shaft 67 rotates in the opposite direction under the action of the motor 68, the above disclosed operations are executed in the opposite sequence, i. e. during the travel of the bar 60 from the position 60c to the position 60b the accordion closes and during its travel from 60b to 60a the accordion returns into its box after which the projections or studs 61a come into contact with the stops 63 so that the arms 61 pivot outwardly and release the rods 8 of the accordion.

The operation of the classifier according to my invention is obtained through a keyboard including five rows of keys respectively at 76, 77, 78, 79 and 80. The keys 76 and 77 are used for selecting the column and the row of the desired train of boxes. The keys 80 serve for the release of this train of boxes and for the starting of the motor driving it. The keys 78 operating selectively on the train thus defined containing the box in which the desired reference card is held, provide for the slowing down of the movement of this train when the box considered comes near the position at which it is to stop. The keys 79 adapted to select the desired accordion produce the accurate stopping of the box in the position for which said accordion lies in front of the bar 60. Lastly the key 107 produces the return of the system into its original position. In the examples illustrated, the keys 76 (Fig. 12) the number of which is three correspond each to a horizontal row of boxes. These keys are carried in a frame not illustrated in said figure and inside which said keys are adapted to slide vertically in antagonism with suitable springs urging them upwardly and which are not either illustrated. The stem of each key 76 carries a shoulder 85 adapted to cooperate with a catch 84 keyed to a shaft 84a, said shaft being yieldingly held in a predetermined angular position by a spring 84b so as to hold the catch 84 against the stems of the keys 76; said stems have different lengths from one key to the other so that the depression of any of these stems will cause a rotary plate 83 to move angularly through a variable angular distance according to the key 76 which has been depressed. The key 76 which has been depressed remains held in said depressed position by the corresponding catch 84 acting on the shoulder 85 of the stem considered.

The small plate 83 is radially secured to the shaft 83a which is rigid in its turn with a crank 83b to which is pivotally secured a horizontal rod 82. This rod 82 carries two arms 81a and 81b, the number of these arms being equal to the number of columns of trains provided in the classifying arrangement. The three angular positions assumed by the plate 83 under the action of the depression of the corresponding keys 76 correspond to the bringing of the corresponding arm 81a or 81b in front of the catch 15 of the corresponding column. Consequently the depression of one of the keys 76 brings the arms 81a and 81b in front of one of the catches 15 of its column, which catch corresponds to the horizontal row inside which is located the train to be selected.

In order to allow the arrangement to return into its original position, the keyboard carries a complementary key 76c provided with a shoulder 85o adapted to cooperate with a projection 84o keyed to the shaft 84a. The radial thickness of the shoulder 85o is such that its cooperation with the projection 84o gives the shaft 84a an angular displacement which is greater than that required for the release of the other catches 84 with reference to the corresponding shoulders 85. Moreover the length of the shoulders 85o axially of the stem of the key 76o is such that during the depression of said key the projection 84o cannot pass above said shoulder and consequently cannot act as a catch. By reason of this arrangement the depression of the key 76o, the stem of which is short enough to not engage the small plate 83, releases the key 76 which has been previously depressed and allows it to return into its original position under the action of a spring. The small plate 83 returns then into its original position under the action of a spring not illustrated.

The keys serve for the actuation of any of the arms 81 and more specifically of the arm corresponding to the column inside which may be found the train which it is desired to start. The keys 77 are designed and arranged in a manner similar to the keys 76 and they may also be bolted in their depressed position by means of catches 84. They are of different lengths so as to give the small rockable plate 177 different angular displacements. This plate is keyed to a shaft 178 carrying a drum 151. The drum 151 is provided with an electrically conductive strip 152a connected through a frictional member or a yielding connecting blade such as 86 to one of the poles, say the negative pole of a current supply. This conductive strip is connected with a conductive plate 152 also provided at the peripheric surface of the drum 151 and adapted to cooperate with either of the two brushes 87a 87b. These brushes are inserted in the circuit of two electro-magnets 88a and 88b respectively, which circuits both lead to the other pole, say the positive pole of the current supply. In other words, when the brush 87b is in contact with the small plate 152, the current fed by 86 passes through the electro-magnet 88a while if the drum 151 is rocked so as to bring the plate 152 in contact with the brush 87b, the current fed by the blade 86 passes through the electro-magnet 88b. These electromagnets 88a and 88b are adapted to attract respectively the bars 89a and 89b, so as to produce the rotation of the arms 81a, 81b.

In its inoperative position, the small plate 177 and consequently the drum 151 rigid therewith are in an angular position such that the contact piece or plate 152 is in contact with one of the brushes, to wit 87a. In the example illustrated there are only two columns of trains and consequently only two arms 81a and 81b and, as it has been just stated, the brush 87a is in contact with the contact piece 172 in the inoperative position of the system; under these conditions the passage of the current will energize the electromagnet 88a so as to rock the arm 81a; consequently it is sufficient to provide a single key 77 for rocking the small plate 177 together with the shaft 178 and the drum 151 in order to bring the contact-piece 152 in contact with the brush 87b when it is desired to energize the electromagnet 88b which rocks then the arm 81b. In other words, the number of keys 77 being equal to the number of columns of boxes reduced by one, if no key 77 is depressed the arrangement is ready for the passage of current through one of the electromagnets 88 corresponding to a given column. The depression of one of the keys 77 switches then the current into one of the electromagnets corresponding to the other column of trains. As explained hereinabove, a key 77c allows returning the key 77 into its inoperative position.

The desired train of boxes being thus selected through the depression of a key 76 and of a key 77, it is possible to act on the keys 80 to release said train and to actuate the motor which displaces it. As a matter of fact, it is sufficient to use a single key 80 adapted to make the small plate 93 rock as illustrated in Fig. 12, but it may seem preferable for various reasons to provide a number of keys 80 equal to the number of reference cards per accordion. In this case the stems of all the keys 80 have the same length and the depression of any of them produces the same rotation of the plate 93. This plate 93 is keyed to a shaft carrying the contact piece forming part of the switch 194—195 inserted in the electric circuit leading to 86 and mentioned hereinabove. This circuit includes also a contact 201—202 (Figs. 12 and 19) of which one element is submitted to the action of the counterweight 12 in a manner such that for the inoperative or lowermost position of the counterweight 12 said contact 201—202 is closed while the counterweight provides for the opening of said contact 201—202 as soon as it begins rising.

Figure 5:
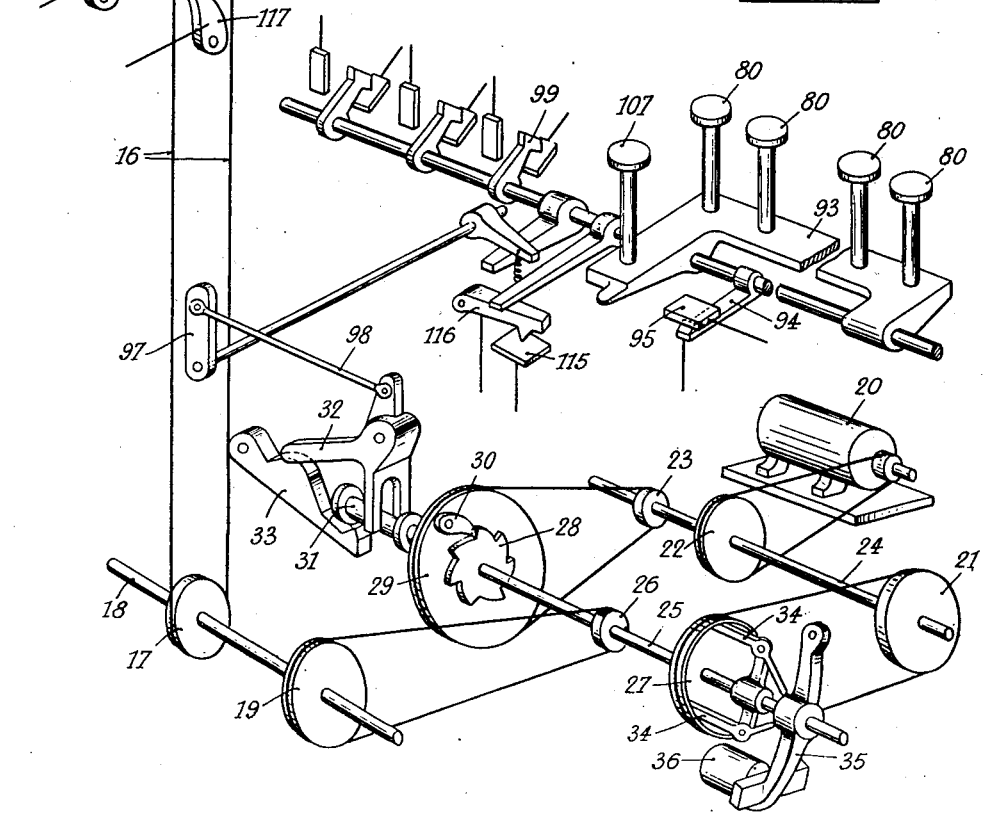
Fig. 5 is a diagrammatic perspective view of the speed change means for the translational movements of the trains of boxes.

The axis of the plate 93 carries also an arm which may be the same if desired as that which has just been mentioned; said arm carries one contact piece 94 of a switch 94—95 inserted in the circuit feeding the electromagnet 96 adapted to actuate the reversing switch 103 controlling the motor 68 (Figs. 5 and 19).

Figure 10:
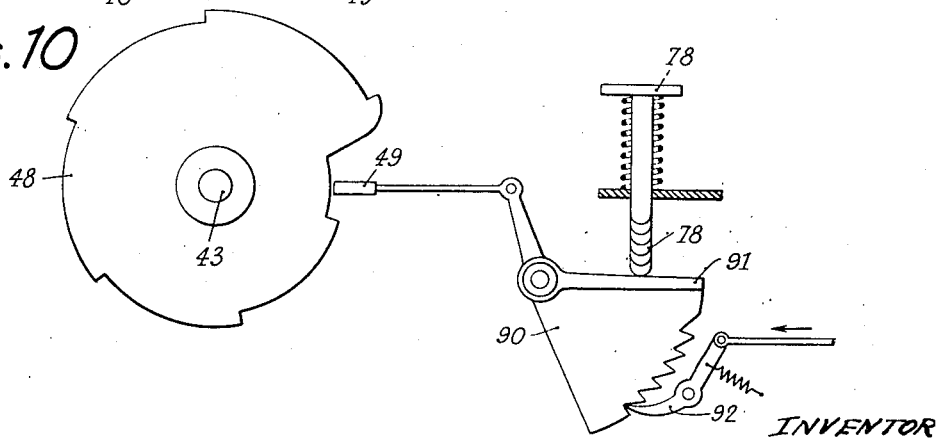
Fig. 10 is a separate view of the device controlling the mechanism of Figs. 8 and 9.

The keys 78 serve for adjusting the position of the stop 49 with reference to the wheel 48. To this end, the apparatus includes a certain number of keys 78 the length of the stems of which changes from one key to the other, a suitable spring being provided for urging each key upward as shown in Fig. 10. The lower end of the rod of each of the keys 78 engages when the key is depressed a pivoting plate 91. The latter is rigid with a quadrant 90, the arcuate edge of which is provided with teeth adapted to cooperate with a catch 92. The plate 91 is moreover rigid with a lever controlling the stop 49.

The operation of this row of keys 78 is easy to understand. As a matter of fact, when one of these keys is depressed, said key produces an angular shifting of the plate 91 and consequently a longitudinal displacement of the sliding stop 49 which brings the latter at a distance from the axis 43 of the wheel 48 which varies according to the key 78 which has been depressed. The rotation of the plate 91 itself depends on the length of the stem of the key 78 which has been depressed, said length depending as stated on the key operated. On the other hand, the quadrant 90 is held against operation by the catch 92 in the angular position given to said quadrant.

An absolutely similar arrangement allows adjusting the position of the stop 51 with reference to the axis 43 through the agency of the keys 79. The detail of the control mechanism actuated by the keys 79 has not been illustrated in the drawings as it is identical as stated with that illustrated in the case of the keys 78.

The release of the stops 49 and 51 is executed by means of rods pivotally secured to catches, such as 92 for the stop 49, which provide for the holding fast of said stops.

I will now describe the operation of the whole classifying system:

As disclosed hereinabove, the arrangement is released by the depression of the key 80, or of one of them in case of a plurality of such keys being used. The depression of said key 80 produces a rotary movement of the plate 93 and consequently provides for the following operations:

(a) The switch is closed at 194—195 so as to energize the circuit starting from the negative pole of the current supply through 194—195 and the switch 201—202 which latter is brought into its closed position by the counterweight 12 when in its inoperative position and opened as soon as the latter moves away from said inoperaive position, the circuit considered continuing through the blade 86, the contact-pieces 152a, 152, the brush 81a, the electromagnet 88a and the positive pole of the current supply. This has for its action, by reason of the energization of the electromagnet 88a, to make the arms 81a pivot and release the catch 15 corresponding to the train which has been selected through the depression of the desired keys 76 and 77. The cone 14 on the cable 9 connected with the train is thus released and engages the counterweight 12.

Figure 6:
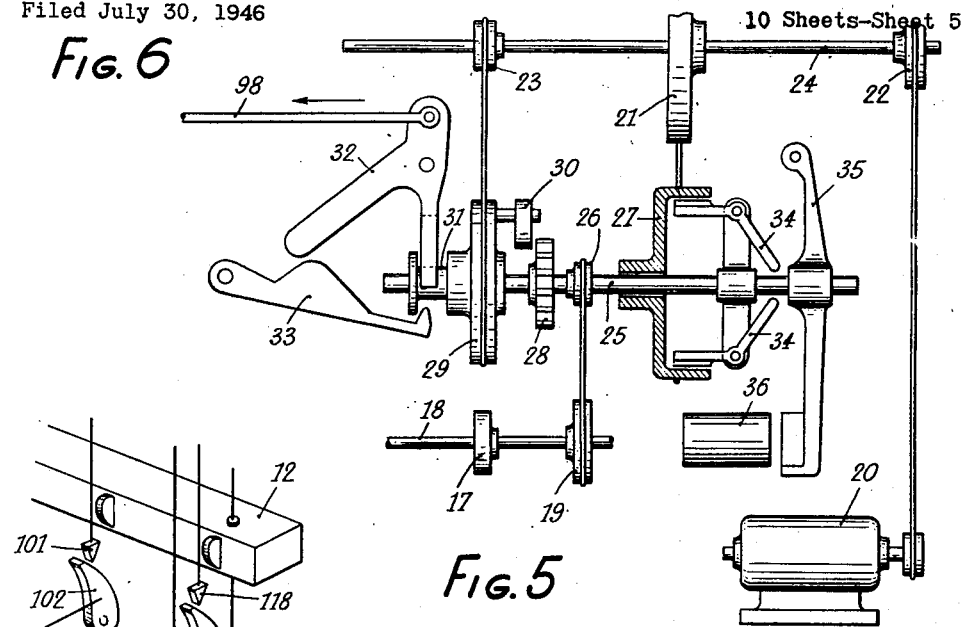
Fig. 6 is a front view corresponding to part of Fig. 5.

(b) The pulley 29 is released with reference to the catch 33 as shown in Figs. 5 and 6 as said catch is urged away by the left hand arm of the lever 32 which is actuated in its turn by the rod 98 carried by the lever 97 keyed to a shaft carrying a projection raised by the rocking movement of a further projection keyed to the shaft carrying the plate 93 as shown in Fig. 5; the release of the pulley 29 with reference to the catch 33 allows said pulley to move nearer the wheel 28 under the action of a spring not illustrated in Figs. 5 and 6 whereby the catch 30 carried by the pulley 29 engages the periphery of the wheel 28.

(c) The movable arms of the reversing switch 99 which are keyed to the rotary axis of the plate 93 rock so as to come into contact with the lower contact pieces forming part of said reversing switch in order to make the motor 20 start in the direction corresponding to the rising movement of the counterweight 12, the switch 57—58 being then closed as shown in Fig. 19.

The key 80 is held fast in the position it has been given through the agency of an arrangement similar to the catch 84 cooperating with the keys 76 and 77, whereby the plate 93 remains in the position which has been given to it.

The movement of the motor is transmitted to the pulley 17 through the agency of the pulleys 22, 23, 29, of the catch 30, of the ratchet wheel 28 and of the pulleys 26 and 19. The cable 16 wound over the pulley 17 and secured to the counterweight 12 causes thus said counterweight to rise. Said counterweight, as soon as it starts, closes the switch 101—102 (Fig. 5).

The electric diagram of Fig. 19 shows that the closing of the switch 101—102 energizes the electromagnet 36 through the circuit starting from the positive terminal of the current supply and leading to the negative pole through the switch 101—102, the electromagnet 36 and the switch 55—56. Said electromagnet 36 controls as shown in Figs. 5 and 6 the arm 35 of the clutch 34 so as to make the pulley 27 rotate integrally with the shaft 25 and consequently with the pulley 26. The movement of the motor 20 is thus transmitted to the pulley 17 through the agency of the pulleys 22, 21, 27, 26 and 19, which corresponds to the higher driving speed of the pulley 17. The train which was in engagement with the counterweight 12 moves downwardly at a high speed while said counterweight rises.

When the rods 5 carried by the boxes 4 of the train considered engage the wheel 41 they make the latter rotate together with the differential system of which it forms a part. As described hereinabove, the wheel 48 forming part of the system considered engages at a given moment the stop 49, which produces the rocking of the blades 50 and 53. The blade 53 which is downwardly shifted with reference to the blade 50 is the first to come into contact with the stop 51. This produces immediately the opening of the switch 55—56 in the feed circuit of the electromagnet 36. The electromagnet 36 is no longer fed and consequently the clutch 34—35 is no longer operative and the train ceases being driven at a high speed through the agency of this clutch. The downward movement of the train continues at a reduced speed until the blade 50 is in its turn stopped by the stop 51. At this moment the switch 57—58 opens, which breaks the circuit feeding the motor 20 while the contact 57—59 is closed so as to energise the circuit starting from the positive pole supply and leading to the negative pole through the contact pieces 57—59, the switch 95—94 and the electromagnet 96; the latter being thus energized acts on the reversing switch 103 so as to bring it into a position for which it is in contact with the lower contact pieces (Fig. 19). This closes the circuit starting from the positive pole and leading to the negative pole through the winding of 68, the reversing arm 103, the contacts 106, 105, the winding 68a of the motor and the lower contact pieces of the reversing switch. The motor 68 begins then rotating in the direction corresponding to the opening of the accordion, the rod 8 of which lies in front of the arm 61 of the opening arrangement illustrated in Fig. 11.

The operation of this arrangement has been disclosed hereinabove and as explained, the bar 60 driven by the motor 68 causes the extraction of the accordion followed by its opening. This being obtained, the motor 68 stops automatically because at this moment the wheel 69 rotating together with the motor produces through the agency of a projection 104 the opening of the contact 105—106. The operator has then only to remove the desired document out of the open accordion.

If it is desired, after returning the document into its accordion container to remove another document, two cases are to be considered:— either this second document or card to be consulted is contained in another train of cards or in the same train as the first considered document, but to the front of the accordion which has been extracted,—or else this second document is located in the same train but to the rear of the accordion which has just been opened.

In the first case, it is necessary to return the displaced train into its starting position and to begin the whole operation which has just been described over again in order to remove the second document. I will therefore describe first the manner of returning the different parts of the arrangement into their starting position.

To obtain this result, I first depress the key 107 (see Figs. 5 and 12). This operation causes the small plate 93 to pivot in the direction opposed to that imparted thereto through the depression of one of the keys 80. It produces the following operations:

(a) It opens the contact 94—95.

(b) It closes the contact 115—116 which closes the circuit connecting the positive pole to the negative pole of the electric supply through the switch 101—102, the electromagnet 36, the switch 115—116. The energization of the electromagnet 36 produces the operation of the clutch 34, 35, 27.

(c) The reversing switch 99 is returned into the position for which its movable arms are in contact with the upper contact pieces.

(d) The pulley 29 is urged away from the ratchet wheel 29 through the rod 98, the lever 97, the shaft carrying said lever and two projections keyed respectively to this shaft and to the shaft rigid with the plate 93.

The breaking of the switch 94—95 opens the feed circuit of the electromagnet 96. Thus, as apparent from Fig. 13, the lever of the reversing switch 103 submitted to the action of this electromagnet rocks through the operation of the return spring 110 which brings the reversing switch back into the position corresponding to the rearward rotation of the motor 68 and corresponding to the position shown in Fig. 19. The circuit of the motor 68 is thus closed between the positive and the negative poles of the supply current through the winding 68, the arm of the reversing switch 103, the switch 114—115, the winding 68a of the motor 68 and the second arm of the reversing switch 103.

The motor 68 starts rearwardly and produces the closing of the accordion which has just been opened and is now returned into its box. At this moment, the projection 104 on the wheel 69 rotating integrally with the motor 68 opens the switch 113—114 and closes the switch 111—112. The opening of the switch 113—114 breaks the feed circuit of the motor 68 and stops its rotation.

The closing of the switch 111—112 closes the following circuit: negative pole of the supply of current, left hand arm of the reversing switch 99 and cooperating contact piece, winding of the motor 20, switch 111—112, switch 117—118, upper contact of the reversing switch 99, central arm of said reversing switch, armature of the motor 20, right hand arm of the reversing switch 101—102, and positive pole of the current supply. This circuit causes the motor 20 to start rotating rearwardly, which returns the wheel 41 together with the blades or plates 50 and 53 into their original position. Simultaneously the cards or boxes forming the train move upwardly and the counterweight 12 sinks. A little before arriving into its starting position, the counterweight 12 moves the contact-piece 117 away from the contact-piece 118 so as to open the switch 117—118 and to insert the resistance 119 in the circuit, said resistance being connected shuntwise with said switch. This resistance reduces the intensity in the latter circuit so that the counterweight moves downwardly at a reduced rate.

The cone 14 engaged by the counterweight 12 engages now its catch 15. The counterweight opens the switch 101—102 which breaks the circuit on the motor 20 in its rearwardly operating direction and de-energizes the electromagnet 36. All the elements of the system have been then returned into their original position. A mechanical connection not illustrated in the drawing between the bar 150 (Fig. 12) and the counterweight 12 has for its action when the counterweight returns into its original position to displace the bar so that it may act on the catches 84, 92 . . . , which locks the keys 76, 77, 78, 79 whereby the different keys return into their original positions.

If the second document to be removed is located beyond the previously open accordion in the same train it is no longer necessary to return the system into its original position for proceeding with the second operation. In this case, I depress first the knob 125 which locks the reversing switch 103, after which the keys 78 and 79 are depressed which correspond to the second accordion to be removed (Fig. 13). This has for its action to bring the stops 49 and 51 into the positions corresponding to the accordions to be extracted. The blade 53 is shifted immediately with reference to the blade 50 under the action of the spring inserted between the blades whereby the switch 57—58 closes and the switch 57—59 opens. The closing of 57—58 starts the motor in the same direction as precedingly. The opening of 57—59 de-energizes the electromagnet 96 and allows the reversing switch 103 to start the motor 68 rearwardly, so that the accordion which has been precedingly removed and unfolded may be refolded and returned into its box. This being executed, the operations described hereinabove are begun over again in the same sequence and in the same manner, the motor 20 rotating of course in its forward direction as the reversing switch 29 has not been displaced.

If it is desired to remove all the documents or cards or to fill in succession all the accordions with the documents they should contain, it is possible by operating as disclosed to act in succession on all the accordions in order to proceed with the desired operations.

However the apparatus may include two further keys allowing the automatic execution of the apparatus. These keys, not illustrated in the drawing, may act for instance as follows: One of them is connected with a ratchet wheel cooperating with the quadrant 90 previously released through any suitable means, so as to make the stop 49 occupy in succession the operative positions corresponding to the different teeth of the wheel 48. The other key would be mounted in a similar manner on the quadrant through the agency of which the stop 51 is controlled in a manner such that each depression of the corresponding key, which is not either illustrated, may bring the stop 51 into the successive operative positions of the blades 50 and 53. It would then be sufficient when the operator requires the successive passage of all the accordions in front of him to depress the complementary key, not illustrated and corresponding to the stop 51, three times in succession as there are three accordions per box, then once on the key corresponding to the stepwise projection of the stop 49, again three times on the key corresponding to the stop 51, once on the key corresponding to the stop 49 and so on.

In the preceding description and for simplifying the explanations, I have referred to a diagrammatic showing of the engagement of the cone 14 with a counterweight 12 with the assumption that the cables 9 carrying the cones 14 slide inside corresponding openings provided in the counterweight while the upper edges of the cone 14 bear directly on the inner surface of the counterweight. Such an arrangement would not be capable of use in practice for various reasons. In particular, the following considerations should be taken into account:

During the rising and lowering of any train, the weight of this train is balanced by the counterweight 12 so that the electric motor 20 may not have too great an effort to exert. However, it is important to notice that at the end of the rising movement of the train and when it is desired to engage the cone 14 on to its catch 15, it is necessary for the latter to move slightly beyond its inoperative position so as to allow this engagement. Now in the absence of any particular arrangement, any displacement of the cone 14 beyond its inoperative position would lead to a displacement not only of the counterweight but also of all the trains of the system. The system being no longer equilibrated, the motor 20 would be no longer capable of providing for the desired displacement.

The arrangement to be disclosed with reference to Figs. 15 to 18 has for its object to remove this drawback. Its action consists chiefly in causing the cone 14 which it is desired to reengage to progress at the end of its return motion through a slight amount with reference to the movement of the counterweight 12 so as to provide for the reengagement before the counterweight has reached its final inoperative position.

To this end and as apparent in the figures mentioned, the counterweight 12 is provided with a number of extensions 121, the number of which is equal to the number of trains. Each of these extensions is provided with a pivot 122 for a two arm lever 152—157. The arm 152 of this lever carries a sleeve 151 pivotally secured to its end and through which passes the cable 9 of the corresponding train while the upper end 14a of the cone 14 is adapted to bear against the lower edge of said sleeve.

Moreover to each cone 14 corresponds a socket 156 engaged by said cone at the end of its downward stroke. Each socket 156 is provided with a slot for the passage of the corresponding catch 15. To the frame is pivotally secured at 153a a bent lever 155 cooperating with the corresponding cone 14 and the right hand end of which is located underneath the socket 156 in the path of the cone 14 while the left hand end 155c of the same lever is adapted to bear for a certain position thereof against the side of a stop formed by a projection 153 also pivotally secured at 153a to the frame. A spring 158 is inserted between the projection 153 and the right hand arm of the lever 155. A stationary stop 154 carried by the frame limits the angular displacements towards the left of the projection 153 which is moreover urged towards said stop 154 through the action of the spring 154a.

This arrangement operates as follows:

Fig. 15 shows the different parts in their inoperative position. When under the action of the electromagnet 88, and as described hereinabove, a catch 15 which is supposed to be that located the most to the front of Fig. 15 has rocked so as to release the corresponding cone 14, the latter rises inside the socket 156 under the action of the motor 20 which drives the corresponding train of boxes, the same movement being moreover executed simultaneously by the counterweight 12. The lever 155 released by the cone 14 pivots then in an anticlockwise direction so that its right hand end may bear against the lower edge of the socket 156. The stop or projection 153, submitted to a rotation in the same direction, is brought into contact with the stop 154 and the whole arrangement assumes the position shown in Fig. 16.

When, after a document has been consulted or removed, it is desired to return the classifying system into its inoperative position, as described hereinabove, the counterweight 12 and the cone 14 receive a downward movement so as to bring the cone 14 into reengagement. At the end of this movement and as apparent in Fig. 17, the end 157 of the double lever pivotally secured at 122 to the counterweight 12 bears against the upper surface 153b of the projection 153. From this moment onwards the sinking movement of the counterweight 12 produces a rocking clockwise motion of the lever 152, 157 during which the roller 157 rises and moves leftwards along the surface 153b. This rocking motion of the arm 152 cooperates with the sinking movement of the pivot 122 of this lever so as to produce an accelerated displacement of the sleeve 151 and consequently of the corresponding cone 14. The latter is brought rapidly beyond its engagement position as required before the counterweight 12 has reached its final inoperative position.

Immediately before the counterweight 12 has reached this position, the cone 14 brings the lever 155 into the position for which its left hand end 155c urges the projection 153 towards the right. The sizes of the different parts are designed in a manner such that this latter movement may be executed at the moment at which the roller 157 has reached the upper part of the sloping edge 153b of the projection 153. Consequently the lever 152, being no longer engaged by the projection 153, may not pivot in a direction opposed to its preceding rocking movement so as to allow a slight rise of the cone 14 whereby its notch may engage the corresponding catch 15. The lever 155 follows this movement under the tractional action of the spring 154a and all the parts return thus into the position illustrated in Fig. 15. The arrangement is thus ready to resume operation as disclosed hereinabove.

Obviously the different forms of execution described have been given out solely by way of examples and without widening thereby the scope of my invention. For instance, it has been supposed that the different parts of the classifier are driven through electric motors. Now, it is possible to use any other source of energy other than electric. Moreover it should be foreseen that in case of any failure in the current supply the system may be actuated by hand by means of a suitable transmission adapted to make up for the failure of the motors 20 and 68.

What I claim is:

1. An automatic classifier for documents, records and like articles comprising a framework, a plurality of columns each including a predetermined number of trains, a predetermined number of boxes for containing said documents and hingedly connected to each other to form each train, a guideway for each train provided on said framework, each guideway including a substantially horizontal and forwardly sloping portion on which the respective train rests in stored position, and a substantially vertical portion, which is connected to said horizontal portion and over which the respective train travels to operative and display position, train locking means comprising cables secured to each train, means for guiding said cables, members carried by said cables, catches cooperating with said members, respectively, a keyboard including keys each corresponding to a predetermined train, respective electromagnets adapted to be influenced by said keys of the keyboard and adapted to control the connection of the corresponding cable member with its catch, and means for selectively driving a respective cable and the respective train along the guideway of the latter to and from said operative position of said respective train.

2. In an automatic classifier according to claim 1, including a counterweight for said trains, and means controlled by the keyboard for connecting said counterweight with each cable member upon release of the latter from its catch and for connecting each catch with its cable member upon release of the latter from its counterweight.

3. An automatic classifier for storing and dispensing prearranged documents, records and like indicators comprising a framework, guide rails carried by said framework and including substantially horizontal guide rail portions and a substantially vertically directed guide rail portion, at least one column of trains, said trains being arranged in superposed position to each other on said substantially horizontal guide rail portions, respectively, said substantially horizontal guide rail portions being connected to said substantially vertically extending guide rail portion, each of said trains including a plurality of boxes hinged to one another, each box containing a plurality of accordion-shaped containers for holding said documents, respective transmission means connected to said trains, locking means cooperable with said transmission means, respectively, driving means operatively connected to said transmission means for moving said trains, respectively, on said guide rails, a control system including a plurality of keys, a predetermined key being adapted to actuate a respective locking means to control the movement of a corresponding train from storing position on its substantially horizontally extending guide rail portion to a display position on said vertical guide rail portion.

4. An automatic classifier according to claim 3, including gear means arranged at the lower end of said vertical guide rail portion and successively engageable with containers of said boxes of a predetermined train.

5. An automatic classifier according to claim 4, including a mechanism for engaging one of said containers and effectuating withdrawal of said one container from a predetermined box of said train.

6. An automatic classifier according to claim 3, including automatically controlled change speed means, and means adapted to cooperate with said change speed means for controlling the traveling speed of said trains in such a manner that the speed thereof is first reduced and is then automatically raised during the major part of the travel of said trains and returns to a reduced value at the end of said travel.

7. In a record classifier, an arrangement for bringing automatically to view and for storing automatically any of said records, comprising a plurality of columns constituted by a plurality of trains of boxes, means for driving selectively said trains between storage and viewing positions, a plurality of record carrying members in said boxes, a first mechanism for automatically stopping the driven train in said viewing position, a second mechanism for withdrawing and opening a given record carrying member, further means for actuating said second mechanism when the driven train is stopped in said viewing position, keyboards including keys corresponding to the different columns, trains, boxes and record carrying members, and an electric arrangement comprising contact means controlled by said mechanisms and by said keys.

E. POPOFF.

REFERENCES CITED

The following references are of record in the file of this patent:

UNITED STATES PATENTS

| Number | Name | Date |
|---|---|---|
| 617,965 | Lippincott et al. | Jan. 17, 1899 |
| 1,683,491 | Rippon | Sept. 4, 1928 |
| 2,174,201 | Chauvin | Sept. 26, 1939 |

FOREIGN PATENTS

| Number | Country | Date |
|---|---|---|
| 52,866 | Switzerland | July 1, 1911 |